(12) United States Patent
Ammler (10) Patent No.: US 9,777,827 B2
(45) Date of Patent: Oct. 3, 2017

(54) METHOD FOR OPERATING A HYDRAULIC SYSTEM OF AN AUTOMATIC TRANSMISSION

(71) Applicant: AUDI AG, Ingolstadt (DE)

(72) Inventor: Stefan Ammler, Bergheim (DE)

(73) Assignee: AUDI AG, Ingolstadt (DE)

( * ) Notice: Subject to any disclaimer, the term of this patent is extended or adjusted under 35 U.S.C. 154(b) by 310 days.

(21) Appl. No.: 14/632,611

(22) Filed: Feb. 26, 2015

(65) Prior Publication Data

US 2015/0247571 A1 Sep. 3, 2015

(30) Foreign Application Priority Data

Mar. 1, 2014 (DE) ........................ 10 2014 003 083

(51) Int. Cl.
*F16H 61/688* (2006.01)
*F16H 61/00* (2006.01)

(52) U.S. Cl.
CPC ..... *F16H 61/0021* (2013.01); *F16H 61/0031* (2013.01); *F16H 61/688* (2013.01); *F16H 2061/0034* (2013.01)

(58) Field of Classification Search
CPC ............ F16H 61/0021; F16H 61/0031; F16H 2061/0034; F16H 61/688
See application file for complete search history.

(56) References Cited

U.S. PATENT DOCUMENTS

| 4,962,830 | A | 10/1990 | Potts |
|---|---|---|---|
| 5,944,159 | A | 8/1999 | Schneider |
| 7,935,025 | B1 | 5/2011 | Lee |
| 2005/0143224 | A1 | 6/2005 | Aoki et al. |
| 2012/0088631 | A1 | 4/2012 | Zhang et al. |

(Continued)

FOREIGN PATENT DOCUMENTS

| CN | 102460922 A | 5/2012 |
|---|---|---|
| CN | 103518081 A | 1/2014 |

(Continued)

OTHER PUBLICATIONS

European Search Report dated Aug. 4, 2015 with respect to counterpart European patent application EP 15 00 0440.

(Continued)

*Primary Examiner* — Huan Le
(74) *Attorney, Agent, or Firm* — Henry M. Feiereisen LLC (57) ABSTRACT

A method for operating a hydraulic system of an automatic transmission, in particular a dual clutch transmission of a vehicle, includes analyzing by a provisioning module of a control device of the automatic transmission whether an intention of a driver to initiate operation of the vehicle exists, wherein the automatic transmission includes a high-pressure circuit which includes a pressure accumulator, at least one clutch, actuators and a charge pump, and when the intention to initiate operation of the vehicle and a requirement to charge the pressure accumulator exist, activating a partial charging operation in which the charge pump is controlled with a charging rotational speed for increasing an actual accumulator pressure of the accumulator to a predetermined switch-off pressure value at which the automatic transmission is ready for operation for a defined period of time.

25 Claims, 7 Drawing Sheets

(56) References Cited

U.S. PATENT DOCUMENTS

| | | | |
|---|---|---|---|
| 2012/0144946 A1* | 6/2012 | Lundberg | F16H 61/0251 74/473.11 |
| 2013/0008154 A1 | 1/2013 | Neuner | |
| 2014/0291101 A1 | 10/2014 | Schuller | |

FOREIGN PATENT DOCUMENTS

| | | |
|---|---|---|
| DE | 32 34 182 A1 | 3/1984 |
| DE | 196 47940 | 5/1998 |
| DE | 10 2010 030 226 | 11/2001 |
| DE | 10 2006 055 544 A1 | 11/2007 |
| DE | 10 2011 003 017 | 8/2011 |
| DE | 10 2010 042 189 A1 | 5/2012 |
| DE | 10 2011 119 702 A1 | 6/2012 |
| DE | 10 2011 100 836 A1 | 8/2012 |
| DE | 10 2011 100 836 | 11/2012 |
| DE | 10 2012 209 904 A1 | 12/2012 |
| EP | 0 992 714 A1 | 4/2000 |
| JP | H0953710 A | 2/1997 |
| JP | 2004-84928 A | 3/2004 |
| JP | 2007-278435 | 10/2007 |
| WO | WO2012/152393 | 11/2012 |

OTHER PUBLICATIONS

Translation of European Search Report dated Aug. 4, 2015 with respect to counterpart European patent application EP 15 00 0440.
Chinese Search Report dated Oct. 9, 2016 with respect to counterpart Chinese patent application 201510090683.9.
English translation of Chinese Search Report issued on Oct. 9, 2016 with respect to counterpart Chinese patent application 201510090683.9.

* cited by examiner

METHOD FOR OPERATING A HYDRAULIC SYSTEM OF AN AUTOMATIC TRANSMISSION

CROSS-REFERENCES TO RELATED APPLICATIONS

This application claims the priority of German Patent Application, Ser. No. 10 2014 003 083.0, filed Mar. 1, 2014, pursuant to 35 U.S.C. 119(a)-(d), the disclosure of which is incorporated herein by reference.

BACKGROUND OF THE INVENTION

The present invention relates to a to a method for operating a hydraulic system of an automatic transmission of a motor vehicle.

The following discussion of related art is provided to assist the reader in understanding the advantages of the invention, and is not to be construed as an admission that this related art is prior art to this invention.

In a dual clutch transmission two sub-transmissions enable a fully automatic gear change without interruption of traction. A torque is transmitted via one of two clutches, which connects the two sub-transmissions with the drive. The clutches and the actuators for engaging the gears are hydraulically controllable via a hydraulic system.

In the hydraulic system known from the state-of-the-art the low-pressure circuit has a cooling pump and the high-pressure circuit has a charge pump with which the pressure accumulator is charged to the required accumulator pressure. The two hydraulic pumps are driven by a common electric motor via a common drive shaft. The electric motor is controlled via a control device. When a requirement to charge the pressure accumulator exists, the electric motor is operated with a charge rotational speed. As an alternative and/or in addition the electric motor is operated with a cooling rotational speed for example when a requirement for cooling exists (i.e., when charging is not required). In addition the high-pressure circuit and low-pressure circuit can be connected via a bypass line with integrated control valve. The control valve can be switched in dependence on the accumulator pressure in the high-pressure circuit without requiring further external energy, i.e., automatically, between a charging position and a non-charging position (i.e., cooling position). In the charging position the hydraulic system operates in the charging mode (i.e., the charge pump is fluidly connected with the high-pressure circuit) at high pump load with correspondingly great actual power consumption. On the other hand in the non-charging position (i.e., cooling position) of the control valve the hydraulic system operates for example in a cooling operation or in another operation, for example a filter cleaning operation.

For reasons of clarity in the following the term cooling position of the control valve is used in most cases. It is noted that the cooling position and the non-charging position of the control valve are identical. In addition for reasons of clarity the terms cooling operation and cooling rotational speed are used in the following. The cooling operation is only an example for a non-charging operation and hence term cooling operation can be replaced with the more general term non-charging operation.

In the cooling position of the control valve the charge pump, beside the cooling pump, is also fluidly connected with the low-pressure circuit and decoupled from the high-pressure circuit. In the cooling operation the hydraulic pumps operate—in contrast to the charging operation—at a lower pump load with correspondingly lower actual power consumption.

In the state-of-the-art the control device can operate in a provisioning mode, in which an intent of the user to start operation of the vehicle is detected via appropriate sensors and/or determined based the occurrence of predefined events. When this is the case it is further tested whether a requirement for charging the pressure accumulator exists. When this criterion is also satisfied a full charge operation is initiated in which the pressure accumulator is filled up to a maximal accumulator pressure. This ensures that the automatic transmission is ready for operation when subsequently initiating operation of the vehicle. The pressure accumulator is therefore always fully charged even when subsequently operation of the vehicle is not initiated but the vehicle is only loaded.

It would therefore be desirable and advantageous to provide a method for operating a hydraulic system of an automatic transmission, in which unnecessary charging processes up to the complete filling of the pressure accumulator are avoided, the number of charging cycles of the vehicle battery is reduced and generally energy can be saved.

SUMMARY OF THE INVENTION

According to one aspect of the present invention, a. method for operating a hydraulic system of an automatic transmission, in particular a dual clutch transmission of a vehicle, includes analyzing by a provisioning module of a control device of the automatic transmission whether an intention of a driver to initiate operation of the vehicle exists, wherein the automatic transmission includes a high-pressure circuit which includes a pressure accumulator, at least one clutch, actuators and a charge pump; and when the intention to initiate operation of the vehicle and a requirement to charge the pressure accumulator exist, activating a partial charging operation in which the charge pump is controlled with a charging rotational speed for increasing an actual accumulator pressure of the accumulator to a predetermined switch-off pressure value at which the automatic transmission is ready for operation for a defined period of time. In the partial charging operation the charge pump is operated with a charging rotational speed in order to no longer increase the accumulator pressure to a maximal pressure value but rather to a predetermined minimal pressure (i.e., switch-off pressure value) at which the automatic transmission is ready to operate. The above mentioned provisioning module together with the charge pump can be integrated into a regulatory circuit in which the charge pump is operated with the charging rotational speed (control value) based on the desired minimal accumulator pressure (target value) and a determined actual accumulator pressure (actual value).

According to another advantageous feature of the invention, the provisioning module has a pressure model unit for determining the actual accumulator pressure. In the pressure model unit a pressure model is stored in which the time behavior of the actual accumulator pressure can be modeled for example by an algorithm. A model accumulator pressure is thus generated in the pressure model unit. The latter is used as the basis for the partial charging operation instead of the actual accumulator pressure. In this embodiment therefore neither an accumulator pressure sensor nor any other valve position sensor, with which a requirement for charging the pressure accumulator in the high-pressure circuit can be determined, is required. Such sensors require an increased number of components. In addition the operation of the sensors may be subject to malfunction.

As mentioned above the partial charging operation is initiated at a start time point when the intent to initiate operation of the vehicle and a requirement to charge the pressure accumulator exist. At this start time point the model accumulator pressure is set to a zero value, at which the model accumulator pressure corresponds to the ambient pressure. When on the other hand it is recognized that no requirement to charge the pressure accumulator exists, i.e., the accumulator pressure is sufficiently great, the provisioning module is deactivated and/or the model accumulator pressure is set to an initial value which is greater than the switch-off pressure value and in particular corresponds to the maximal accumulator pressure.

In a technical realization, the pressure accumulator can be a piston cylinder unit in which an oil chamber, which is fluidly connected with the hydraulic lines, can be acted upon by means of a pre-tensioned pressure piston. The pretension can be realized via a pressure spring or via a gas pressure. This means that when the oil chamber is filled with hydraulic oil, a hydraulic pressure greater than a pretension pressure exists in the pressure accumulator, which is described below.

The pressure accumulator can for example be a piston cylinder unit with an oil chamber, which is connected with the hydraulic lines, and a pre-tensioned pressure piston. The pretension is for example achieved by a gas pressure, which impinges on the pressure piston. When the oil chamber is completely empty the pressure piston is pushed with a pretension force against a mechanical stop of the pressure accumulator. This means that for overcoming the pretension force in a filling process, a hydraulic pressure greater than a pretension pressure corresponding to the pretension force must be exerted on the pressure piston.

Thus in a partially filled state of the pressure accumulator, the hydraulic oil exerts an accumulator pressure on the pressure piston which is greater than the pretension pressure. In the completely empty state the hydraulic lines are not impinged with pressure by means of the pressure accumulator. Rather an ambient pressure prevails in the hydraulic lines. An operational readiness of the automatic transmission is given when all hydraulic lines are filled with hydraulic oil and a hydraulic pressure greater than the pretension pressure prevails in the hydraulic lines.

The minimum pressure, which forms the target value (i.e., switch-off pressure value), is preferably greater than the pretension pressure by a first pressure difference. When in the partial charging operation the model accumulator pressure exceeds the switch-off pressure, the provisioning module switches off the charge pump. On the other hand when falling below a switch-on pressure value the charge pump is switched on again. The switch-on pressure value is lower than the switch-off pressure value by a second pressure difference. In addition this second pressure difference is preferably smaller than the above-mentioned first pressure difference. This ensures that the partial charging operation is reliably switched on and off above the above-mentioned pretension pressure.

Due to component tolerances the deviation between the model accumulator pressure and the actual accumulator pressure increases with each switching on and off process and also with increased duration of the partial charge operation, which may result in a faulty control of the charge pump. In order to avoid this the charge pump can be continuously operated with the charging rotational speed independent from the actual calculated model accumulator pressure after a predetermined number of switching on and off processes, for example after three switching on and off processes, which results in an increase of the actual accumulator pressure up to a maximum pressure value.

In contrast to the above-described partial charging operation, the control device can for example carry out a full charging operation for example when initiating operation of the vehicle and in the presence of a requirement to charge the accumulator. In the full charging operation the charge pump is operated with a charging rotational speed in order to increase the accumulator pressure to a maximal pressure value, which is greater than the switch-off pressure value.

The provisioning module can deactivate the partial charge operation in the case of pre-defined events for example in the event of an actual start of operation of the vehicle.

Preferably the requirement for pressure charging can be determined based on the actual power consumption of the electric motor of the charge pump and also on the actual rotational speed of the electric motor. This manner of determining whether a requirement of charging exists is based on the fact that an actual power consumption of the electric motor of the charge pump during a charging operation for charging the pressure accumulator is significantly greater than the actual power consumption of the electric motor in the case of a requirement for cooling the clutches.

Beside the high-pressure circuit the hydraulic system can have a low-pressure circuit for cooling the clutches. The high-pressure circuit and the low-pressure circuit can respectively have a cooling pump and a charge pump, which can be driven via a common electric motor. The high-pressure circuit and the low-pressure circuit can be connected via a bypass line with integrated control valve. The control valve can be switched in dependence on the accumulator pressure in the high-pressure circuit without requirement of further external energy, which means automatically, between a charging position in which the hydraulic system operates in the charging operation, and a non-charging position (cooling position), in which the hydraulic system is operated in the non-charging operation. The control valve can therefore automatically assume a charging position when the accumulator pressure in the high-pressure circuit falls below a lower threshold value. Vice versa, the control valve can automatically assume its non-charging position (cooling position) when the accumulator pressure in the high-pressure circuit exceeds an upper threshold value. After completed full charging operation the accumulator pressure in the high-pressure circuit corresponds to the upper threshold value.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Figure 1:
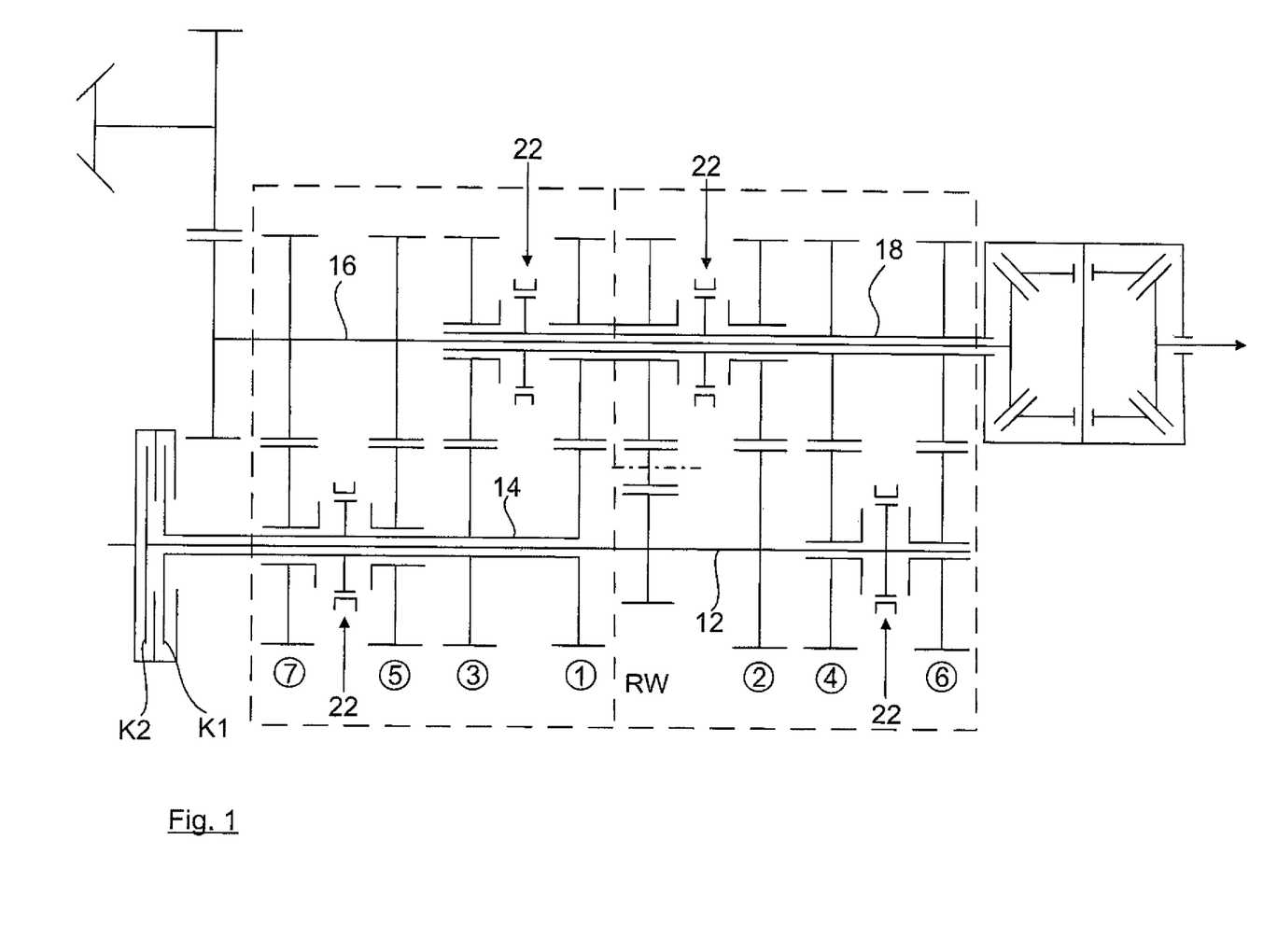
FIG. 1 shows a circuit diagram particular clutch transmission for a motor vehicle with seven forward gears and a reverse gear.

Turning now to the drawing, and in particular to FIG. 1, there is shown a schematic diagram of a dual-clutch transmission for a motor vehicle with four-wheel-drive. The dual-clutch transmission has seven forward gears (cf. the circled digits 1 to 7) and a reverse gear RW. In the following, the dual-clutch transmission is explained to the degree necessary for understanding the invention. The dual-clutch transmission has two input shafts 12, 14, which are arranged coaxial to each other and can be alternately connected with the drive source, for example an internal combustion engine, via two hydraulically actuatable multiple disc clutches K1, K2. The input shaft 14 is configured as a hollow shaft in which the input shaft 12, which is configured as solid shaft, is guided. The two input shafts 12, 14 drive via gear sets of the forward gears and the reverse gear onto an output shaft 16 which is arranged parallel to the axis, and onto an intermediate shaft 18 which is configured as a hollow shaft. The gear sets of the forward gears 1 to 7 each have fixed gears and movable gears, which can be switched via actuators 22. The actuators 22 can for example be dual synchronous clutches, which can each switch neighboring movable gears from a neutral position.

Figure 2A:
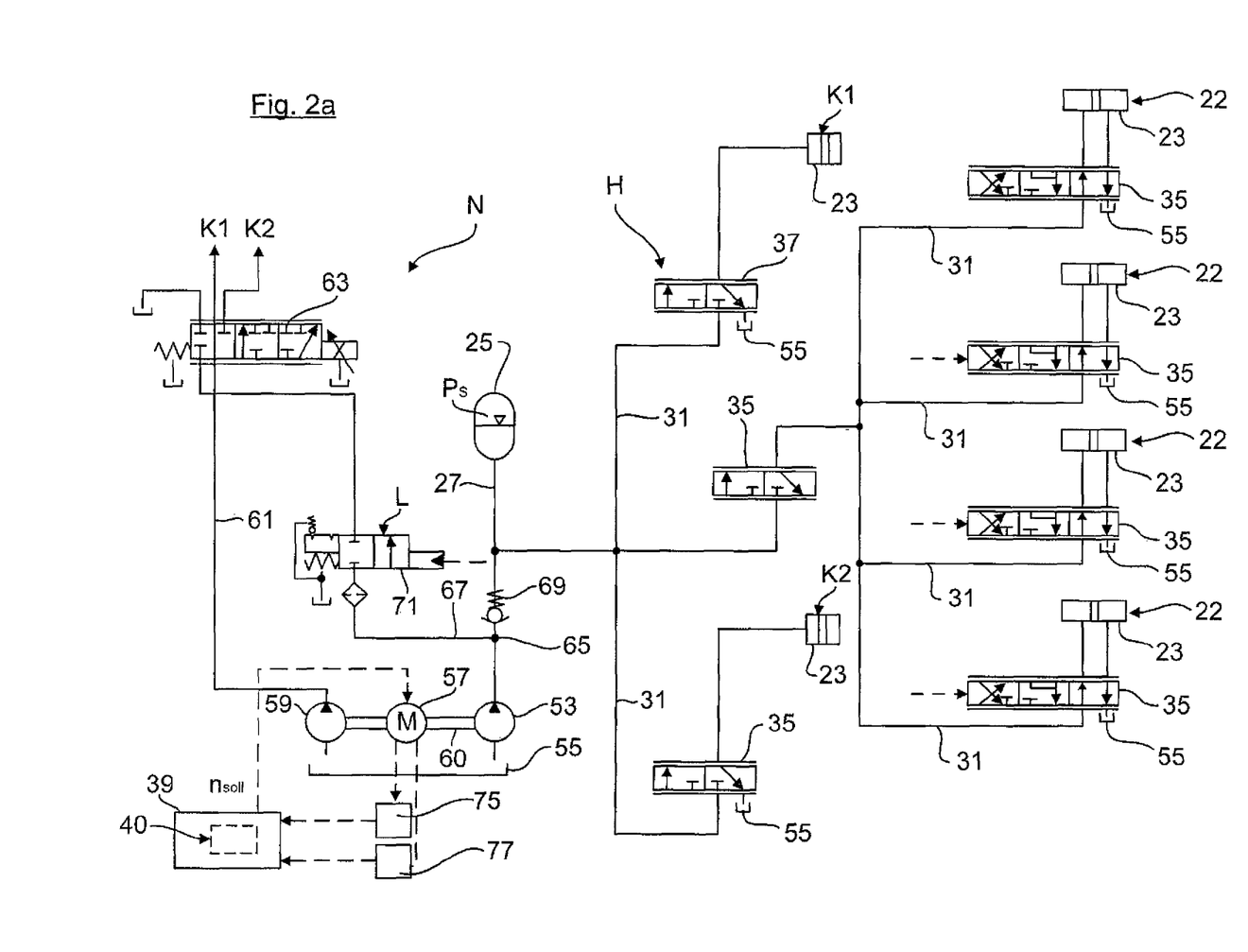
FIG. 2a shows a hydraulic system of the dual clutch transmission of FIG. 1.

FIG. 2a shows the hydraulic system of the dual clutch transmission in a strongly simplified circuit diagram. By means of the hydraulic system the hydraulic cylinders 23 of the clutches K1, K2 and the actuators 22 are actuated. According to FIG. 2a the hydraulic system has a high-pressure circuit H and a low-pressure circuit N. In the high-pressure circuit H the hydraulic cylinders 23 of the clutches K1, K2 switched therein, and the actuators 22 can be impinged with an accumulator pressure $p_s$ via a pressure accumulator 25, which accumulator pressure is within the range of for example 30 bar. For this a main line 27, which is connected to the pressure accumulator 25, is guided to the hydraulic cylinders 23 via not further described partial lines 31. In the partial lines 31 respective control valves 35 are arranged. The control valves 35 can be controlled via a central control device 39, in a not shown manner.

The hydraulic system also has a charge pump 53, which on the input side is connected with an oil sump 55. The charge pump 53 can be controlled by the control unit 39 to charge the pressure accumulator 25 via an electric motor 57. In addition the charge pump 53 together with a cooling pump 59 is arranged on a common drive shaft 60, which is driven by the electric motor 57. The cooling pump 59 is on the output side connected with a low-pressure line 61, which leads to a distribution valve 63. Depending on the position of the distribution valve 63, the hydraulic fluid can be conducted to the first and/or second clutch K1, K2 and subsequently back into the oil sump 55 when a cooling requirement exists.

According to FIG. 2 the main line 27 of the high-pressure circuit H branches of at a branching site 65 into a bypass line 67, which is connected with the low-pressure line 61 of the low-pressure circuit N. downstream of the branching site 65 a check valve 69, which will be described below, is arranged. In addition a control valve 71 is integrated in the bypass line 67. The control valve 71 can be adjusted depending on the level of the accumulator pressure $p_s$ in the high-pressure circuit H between the charging position L shown in FIG. 2a and a cooling position K. The accumulator pressure $p_s$ in the high-pressure circuit H acts as a control pressure with which the control valve 71 can be adjusted without additional external energy, i.e., automatically. The control valve 71 is configured so that it automatically assumes the charging position L when the accumulator pressure $p_s$ in the high-pressure circuit H for example falls below a lower threshold value for example 25 bar. In addition the control valve 71 is automatically displaced into its cooling position K when the accumulator pressure $p_s$ exceeds an upper threshold value $p_{max}$ for example 28 bar.

Figure 2B:
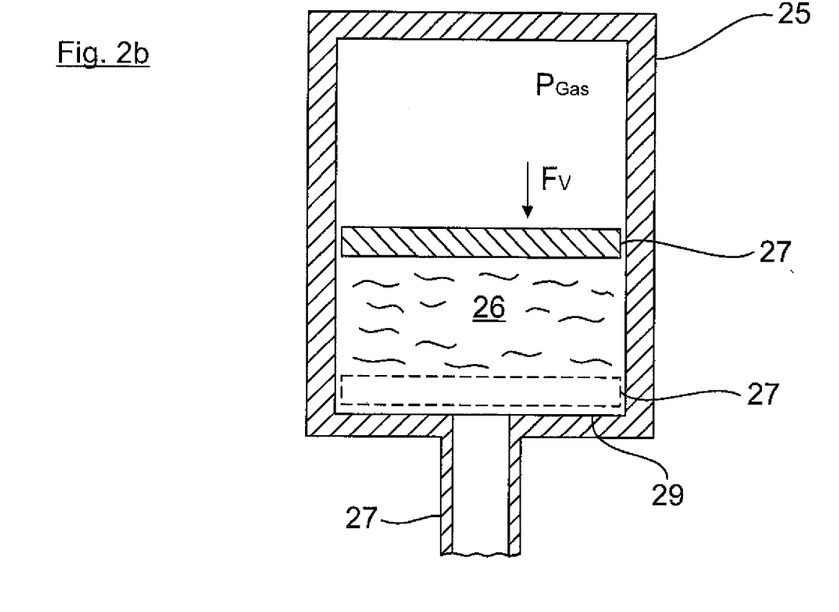
FIG. 2b shows an example of a pressure accumulator by itself.

FIG. 2b shows the general construction at the function of the pressure accumulator 25. Accordingly the pressure regulator 25 is a piston cylinder unit with an oil chamber 26, which is connected with the hydraulic lines 27, 31, and a pre-tensioned pressure piston 27. The pretension in this example is achieved by a gas pressure $p_{gas}$, which acts on the pressure piston 27. As an alternative the pretension can also be achieved by a spring. When the oil chamber 26 is completely empty the pressure piston 27 (indicated with the dashed line in FIG. 2b) is pushed against a stop 29 of the pressure accumulator 25 with a pretension force $F_v$. This means that during a filling process a hydraulic pressure greater than a pretension pressure $p_v$ corresponding to the pretension force $F_v$ prevails for overcoming the pretension force $F_v$.

In FIG. 2b the pressure accumulator 25 is shown in a partially filled state, in which the hydraulic oil acts on the pressure piston 27 with an accumulator pressure thereby forming a pretension force $F_v$. In the completely empty state the hydraulic lines 27, 31 are not impinged with pressure by means of the accumulator 25. Rather, ambient pressure prevails in the hydraulic lines 27, 31. An operational readiness of the automatic transmission is given when all hydraulic lines 27, 31 are filled with hydraulic oil and a hydraulic pressure prevails in the hydraulic lines 27 which is greater than the pretension pressure $p_v$, i.e., by a predetermined pressure difference so that the operational readiness is not immediately lost after switching on the charge pump 53 due to a basic leakage.

During driving operation pressure losses occur due to actuation of the clutches K1, K2 and the actuators 22. In addition further pressure losses occur due to the basic leakage in the high-pressure circuit H, which means due to leakages resulting from valve gaps or the like. As a result the accumulator pressure $p_s$ is reduced during the driving operation. In the case that the accumulator pressure $p_s$ falls below the lower threshold value (i.e., a requirement to charge the pressure accumulator exists) the control valve 71 automatically assumes its charging position L (FIG. 2a). When a requirement to charge the pressure accumulator exists the control device 39 controls the electric motor 57 with a charging rotational speed $n_L$. This enables the charge pump 53 to charge the pressure accumulator 25. In such a charging operation the charge pump 53 operates under great pump load and therefore with a correspondingly great actual power consumption $l_{ist}$. When the accumulator pressure $p_s$ exceeds the upper threshold value $p_{max}$ (which means a requirement to charge the pressure accumulator no longer exists) the control valve 71 automatically assumes its cooling position K. In the cooling position K the charge pump 53 delivers hydraulic oil via the now opened bypass line 67 into the low-pressure circuit N. At the same time the high-pressure circuit H is closed pressure-tight via the check valve 69. Correspondingly the charge pump 53 no longer operates with a high but rather with a reduced pump load and also a correspondingly reduced actual power consumption $l_{ist}$.

Figure 3:
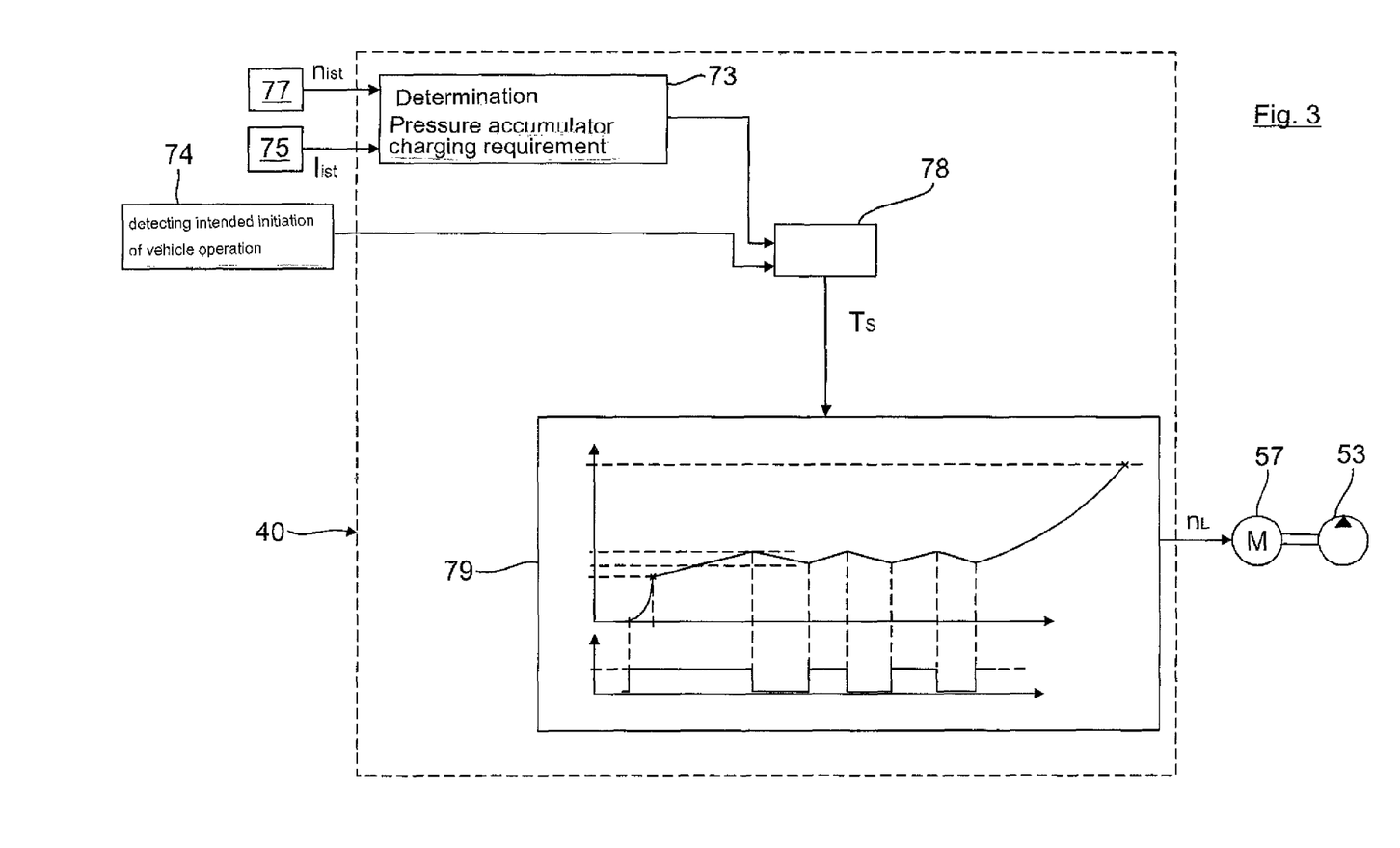
FIG. 3 shows program components in a further circuit diagram, which illustrate the provisioning module.

As mentioned above the control device 39 controls the electric motor 57 with a charge rotational speed $n_L$ when a requirement to charge the pressure accumulator exists. For recognizing such a requirement to charge the pressure accumulator, a pressure sensor in the high-pressure circuit H or a positional sensor in the control valve 71 is not required according to the invention. Instead the control device 39 has an analysis unit 73 (FIG. 3). According to FIG. 3 the analysis unit 73 is in signal communication with a current-measuring device 75 integrated in the motor control, which current measuring device measures an actual power consumption $l_{ist}$ of the electric motor 57. The analysis unit 73 is also in signal communication with a rotational speed sensor 77 which measures an actual rotational speed $n_{ist}$ of the electric motor 57.

According to FIG. 3 the analysis unit 73 is a component of a provisioning module 40 and is in signal communication with an appropriate sensor system 74 for detecting an intended initiation of operation of the vehicle. The sensor system is not included in the invention. Its construction and its function are therefore not further described.

When a requirement to charge the pressure accumulator and an intended initiation of operation of the vehicle exist, an activation unit 78 in the provisioning module 40 generates a trigger signal $T_s$ with which a partial charging operation T (FIG. 4) is initiated. In the partial charging operation T (FIG. 4) the charge pump 53 is controlled with a charging rotational speed $n_L$ in order to increase the actual accumulator pressure $p_{ist}$ to a predetermined switch-off pressure value $p_{aus}$, at which the automatic transmission is ready for operation for a defined period of time (taking into account the basic leakage).

According to the invention the provisioning module 40 controls a charge pump 53 not based on the actual accumulator pressure $p_{ist}$ but rather based on a pressure model stored in the pressure model unit 79. In the pressure model the time behavior of the actual accumulator pressure $p_{ist}$ is modeled by a model accumulator pressure $p_M$. In the time behavior of the model accumulator pressure $p_M$ the control of the charge pump of 53 with the charging rotational of speed $n_L$ as well as a decrease of the accumulator pressure due to a basic leakage pressure loss is taken into account. This model accumulator pressure $p_M$ is the a basis for regulating the partial charging operation T, which enables omitting a sensor-based detection of the actual accumulator pressure.

Figure 4:
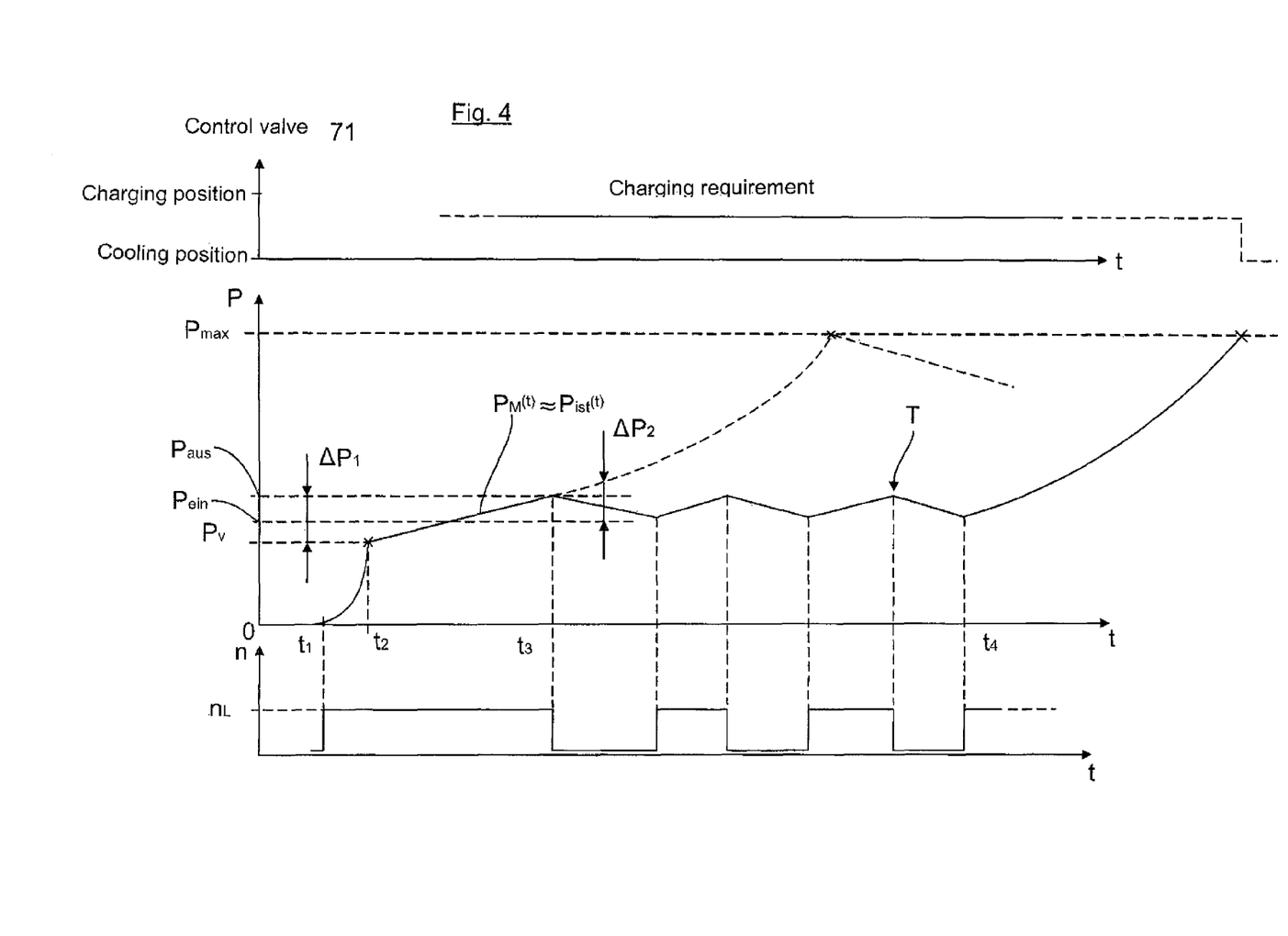
FIGS. 4 to 6 respectively show diagrams illustrating the partial charging operation, the full charging operation, and a termination criterion of the partial charging operation.

FIG. 4 shows diagrams illustrating the partial charging operation T. According to this the partial charging operation T is initiated at a time point $t_1$, i.e., after activation of the pressure model by the activation unit 78. The pressure model is for example stored in the pressure model unit 79 as an algorithm.

With the start of the partial charging operation T at the time point $t_1$, the charge pump 53 is controlled with a charging rotational speed $n_L$, whereby the hydraulic lines 27, 31 are filled with hydraulic oil until the pretension pressure $p_v$ is reached at the time point $t_2$. After reaching the pretension pressure $p_v$ the oil chamber 26 of the pressure accumulator 25 is filled, i.e., by displacing the pressure piston 27 against the pretension force $F_v$. At the start time point $t_1$ the model accumulator pressure $p_M$ is also set to a zero value at which the model accumulator pressure $p_M$ corresponds to the ambient pressure.

At the time point $t_3$ the model accumulator pressure $p_M$ reaches the switch-off pressure value $p_{aus}$. When exceeding the switch-off pressure value $p_{aus}$ the provisioning model 79 switches off the electric motor 57 of the charge pump 53, that means the charging rotational speed $n_L$ is set to zero and the model accumulator pressure $p_M$ decreases again due to the basic leakage. When on the other hand the model accumulator pressure $p_M$ falls below a switch-on pressure value $p_{ein}$, the charge pump 53 is switched on again. According to FIG. 4 the switch-off pressure value $p_{aus}$ is higher than the pretension pressure $p_v$ by a first pressure difference $\Delta_{p1}$. In addition the switch-on pressure value $p_{ein}$ is lower than the switch-off pressure value $p_{aus}$ by a second pressure difference $\Delta_{p2}$. The second pressure difference $\Delta_{p2}$ is smaller than the first pressure difference $\Delta_{p1}$.

As shown in FIG. 4 multiple, for example all three, on and off switching processes occur in the partial charging operation T. After a time point $t_4$ the provisioning model 40 permanently controls the charge pump 53 with the charging rotational speed $n_L$, i.e., independent of the actual calculated model accumulator pressure $p_M$.

Figure 5:
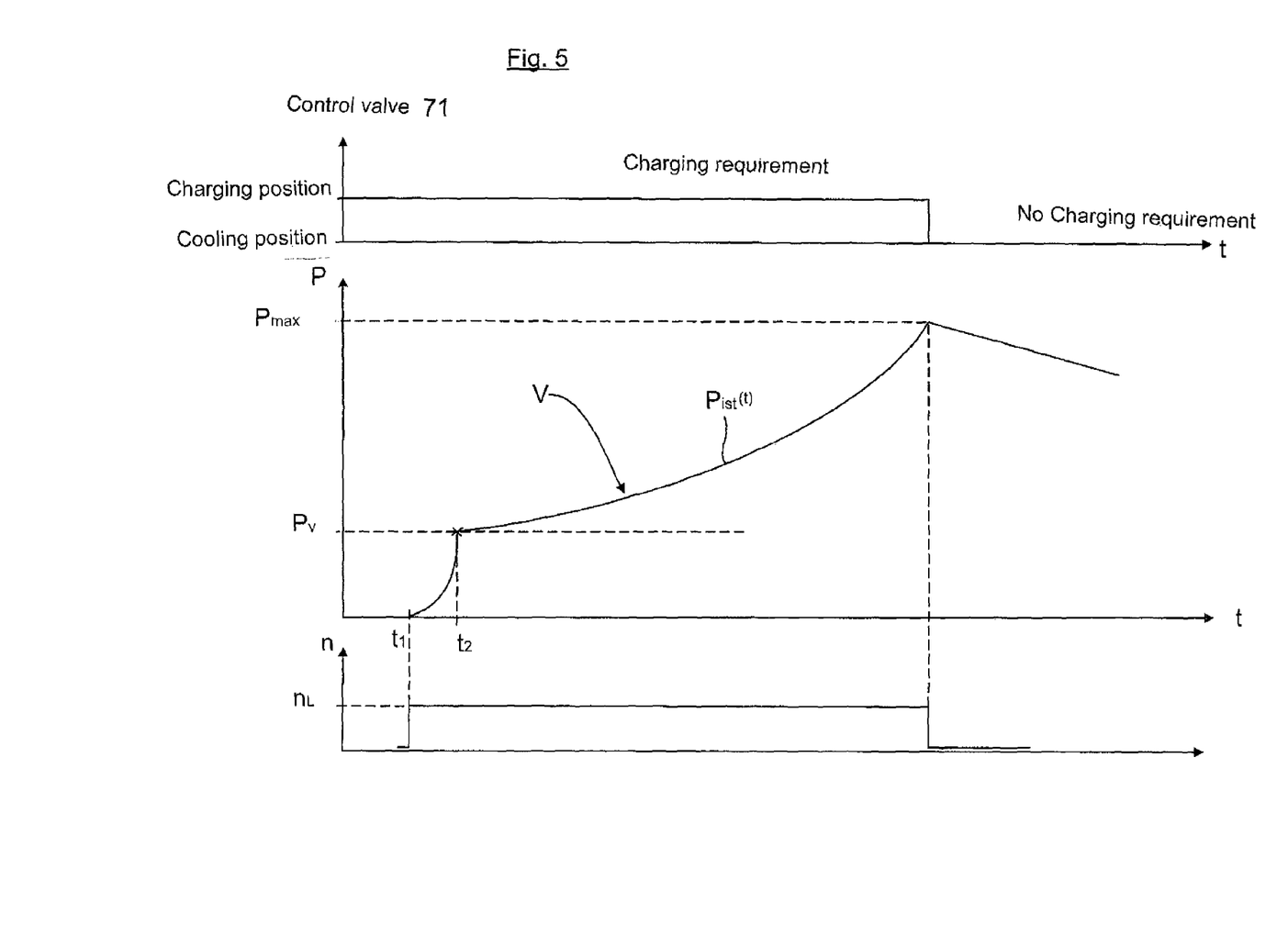

In contrast to the partial charging operation T shown in FIG. 4, FIG. 5 shows the full charging operation V. The full charging operation V occurs for example when the vehicle is actually operated and also when a requirement to charge the pressure accumulator exists. In contrast to the partial charging operation T, the accumulator pressure $p_{ist(t)}$ is increased in the full charging operation V to the maximal pressure value $p_{max}$.

Figure 6:
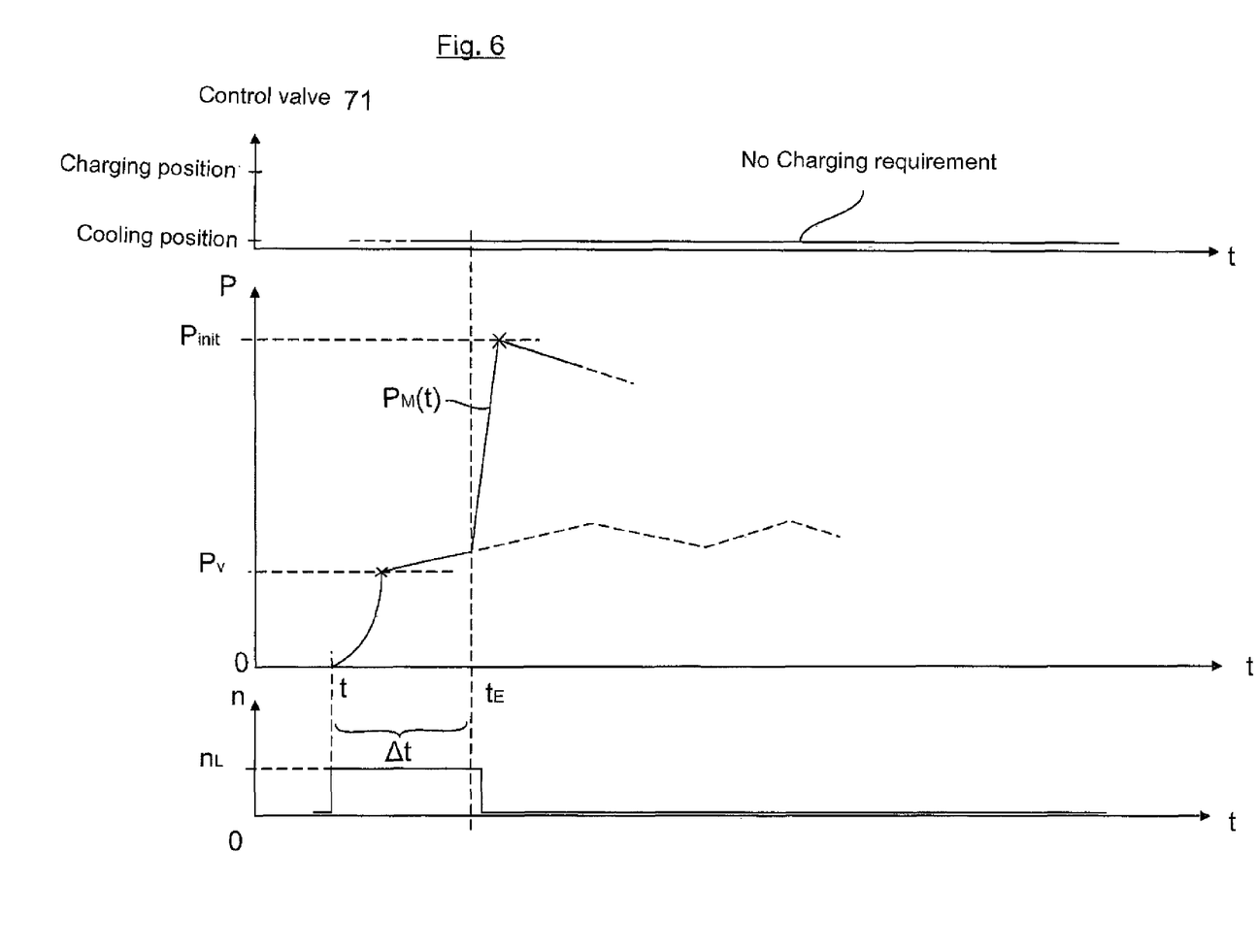

The partial charging operation T can be deactivated at predetermined events, for example when the vehicle is actually operated or when a requirement to charge the pressure accumulator does not exist, as illustrated in FIG. 6. According to FIG. 6 the partial charging operation T initially starts at a time point $t_1$. With a small temporal offset $d_t$ after the time point $t_1$, the analysis unit 73 recognizes at the time point $t_E$ that no requirement to charge the pressure accumulator exists, which means that the pressure accumulator 25 is still sufficiently filled with hydraulic oil. At the time point $t_E$ therefore the model pressure $p_M$ is increased to an initial value $p_{init}$. As a result the charging rotational speed of the charge pump 53 is decreased to zero.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A method for operating a hydraulic system of an automatic transmission of a vehicle, comprising:
   analyzing by a provisioning module of a control device of the automatic transmission whether an intention of a driver to initiate operation of the vehicle exists, said automatic transmission comprising a high-pressure circuit which comprises a pressure accumulator, at least one clutch, actuators and a charge pump; and when the intention to initiate operation of the vehicle and a requirement to charge the pressure accumulator exist, activating a partial charging operation in which the charge pump is controlled with a charging rotational speed for increasing an actual accumulator pressure of the accumulator to a predetermined switch-off pressure value at which the automatic transmission is ready for operation for a defined period of time, wherein for determining the actual accumulator pressure of the pressure accumulator the provisioning module has a pressure model unit in which a pressure model is stored in which a time behavior of the actual pressure of the pressure accumulator is simulated by way of a model accumulator pressure to correspond to the partial charging operation, and wherein at a start of the partial charging operation the model accumulator pressure is settable to a zero value at which the model accumulator pressure corresponds to an ambient pressure.

2. The method of claim 1, wherein the provisioning module and the charge pump are integrated in a regulatory circuit in which the provisioning module controls the charge pump based on the switch-off pressure value and a determined actual pressure of the pressure accumulator.

3. The method of claim 1, wherein the time behavior is simulated by controlling the charge pump with the charging rotational speed and by taking into account a decrease of the accumulator pressure due to a basic leakage pressure loss.

4. The method of claim 1, wherein the pressure accumulator is a piston cylinder unit in which a pre-tensioned pressure piston acts upon an oil chamber, which is connected with hydraulic lines, wherein when the oil chamber is completely empty the pre-tensioned pressure piston is pushed against a stop of the pressure accumulator with a pretension force, and wherein for overcoming the pretension force during a filling process a hydraulic pressure prevails which is greater than a pretension pressure which corresponds to the pretension force.

5. The method of claim 4, wherein model pressure thresholds of the pressure model unit, in particular the pretension pressure are stored for different temperatures.

6. The method of claim 4, wherein the switch-off pressure value is greater than the pretension pressure by a first pressure difference.

7. The method of claim 6, wherein when exceeding the switch-off pressure value the provisioning module switches off the charge pump, and when falling below a switch-on pressure value the provisioning module switches on the charge pump, said switch-on pressure value being smaller than the switch-off pressure value by a second pressure difference which is smaller than the first pressure difference.

8. The method of claim 6, wherein the provisioning module controls the charge pump after a number of switching on and switching off processes independent from an actual calculated model accumulator pressure.

9. The method of claim 1, wherein the provisioning module deactivates the partial charging operation in response to predetermined events.

10. The method of claim 1, configured for operating a hydraulic system of a dual clutch transmission of the vehicle.

11. A method for operating a hydraulic system of an automatic transmission of a vehicle, comprising:

analyzing by a provisioning module of a control device of the automatic transmission whether an intention of a driver to initiate operation of the vehicle exists, said automatic transmission comprising a high-pressure circuit which comprises a pressure accumulator, at least one clutch, actuators and a charge pump;

when the intention to initiate operation of the vehicle and a requirement to charge the pressure accumulator exist, activating a partial charging operation in which the charge pump is controlled with a charging rotational speed for increasing an actual accumulator pressure of the accumulator to a predetermined switch-off pressure value at which the automatic transmission is ready for operation for a defined period of time, wherein for determining the actual accumulator pressure of the pressure accumulator the provisioning module has a pressure model unit in which a pressure model is stored in which a time behavior of the actual pressure of the pressure accumulator is simulated by way of a model accumulator pressure to correspond to the partial charging operation; and deactivating the provisioning module and/or setting the model accumulator pressure to an initial value which is greater than the switch-off pressure value when the intention to start operation of the vehicle exists and a requirement to charge the pressure accumulator does not exist.

12. The method of claim 11, wherein the provisioning module and the charge pump are integrated in a regulatory circuit in which the provisioning module controls the charge pump based on the switch-off pressure value and a determined actual pressure of the pressure accumulator.

13. The method of claim 11, wherein the pressure accumulator is a piston cylinder unit in which a pre-tensioned pressure piston acts upon an oil chamber, which is connected with hydraulic lines, wherein when the oil chamber is completely empty the pre-tensioned pressure piston is pushed against a stop of the pressure accumulator with a pretension force, and wherein for overcoming the pretension force during a filling process a hydraulic pressure prevails which is greater than a pretension pressure which corresponds to the pretension force.

14. The method of claim 13, wherein model pressure thresholds of a pressure model unit, in particular the pretension pressure are stored for different temperatures.

15. The method of claim 13, wherein the switch-off pressure value is greater than the pretension pressure by a first pressure difference.

16. The method of claim 15, wherein when exceeding the switch-off pressure value the provisioning module switches off the charge pump, and when falling below a switch-on pressure value the provisioning module switches on the charge pump, said switch-on pressure value being smaller than the switch-off pressure value by a second pressure difference which is smaller than the first pressure difference.

17. The method of claim 11, wherein the provisioning module deactivates the partial charging operation in response to predetermined events.

18. A method for operating a hydraulic system of an automatic transmission of a vehicle, comprising:

analyzing by a provisioning module of a control device of the automatic transmission whether an intention of a driver to initiate operation of the vehicle exists, said automatic transmission comprising a high-pressure circuit which comprises a pressure accumulator, at least one clutch, actuators and a charge pump;

when the intention to initiate operation of the vehicle and a requirement to charge the pressure accumulator exist, activating a partial charging operation in which the charge pump is controlled with a charging rotational speed for increasing an actual accumulator pressure of the accumulator to a predetermined switch-off pressure value at which the automatic transmission is ready for operation for a defined period of time, wherein when the intent to start operation of the vehicle and the requirement to charge the pressure accumulator exist, the control unit performs a full charging operation in which the charge pump is controlled with the charging rotational speed for increasing the actual accumulator pressure to a maximal value, which is greater than the switch-off pressure value, and wherein an initial value to which a model accumulator pressure is set when the requirement to charge the accumulator does not exist, is greater than the switch-off pressure value.

19. The method of claim 18 wherein the pre-determined events comprise a start of operation of the vehicle.

20. The method of claim 18, wherein the provisioning module and the charge pump are integrated in a regulatory circuit in which the provisioning module controls the charge pump based on the switch-off pressure value and a determined actual pressure of the pressure accumulator.

21. The method of claim 18, wherein the pressure accumulator is a piston cylinder unit in which a pre-tensioned pressure piston acts upon an oil chamber, which is connected with hydraulic lines, wherein when the oil chamber is completely empty the pre-tensioned pressure piston is pushed against a stop of the pressure accumulator with a pretension force, and wherein for overcoming the pretension force during a filling process a hydraulic pressure prevails which is greater than a pretension pressure which corresponds to the pretension force.

22. The method of claim 21, wherein the switch-off pressure value is greater than the pretension pressure by a first pressure difference.

23. The method of claim 22, wherein when exceeding the switch-off pressure value the provisioning module switches off the charge pump, and when falling below a switch-on pressure value the provisioning module switches on the charge pump, said switch-on pressure value being smaller than the switch-off pressure value by a second pressure difference which is smaller than the first pressure difference.

24. The method of claim 21, wherein model pressure thresholds of a pressure model unit, in particular the pretension pressure are stored for different temperatures.

25. The method of claim 18, wherein the provisioning module deactivates the partial charging operation in response to predetermined events.

* * * * *